United States Patent
Wang et al.

(10) Patent No.: US 12,206,914 B2
(45) Date of Patent: Jan. 21, 2025

(54) METHODS, SYSTEMS, AND MEDIA FOR DETERMINING PERCEPTUAL QUALITY INDICATORS OF VIDEO CONTENT ITEMS

(71) Applicant: Google LLC, Mountain View, CA (US)

(72) Inventors: Yilin Wang, San Jose, CA (US); Balineedu Adsumilli, Foster City, CA (US); Junjie Ke, Stanford, CA (US); Hossein Talebi, San Francisco, CA (US); Joong Yim, Mountain View, CA (US); Neil Birkbeck, Santa Cruz, CA (US); Peyman Milanfar, Menlo Park, CA (US); Feng Yang, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/021,636

(22) PCT Filed: Jun. 8, 2022

(86) PCT No.: PCT/US2022/032668
§ 371 (c)(1),
(2) Date: Feb. 16, 2023

(87) PCT Pub. No.: WO2022/261203
PCT Pub. Date: Dec. 15, 2022

(65) Prior Publication Data
US 2023/0319327 A1    Oct. 5, 2023

Related U.S. Application Data

(60) Provisional application No. 63/210,003, filed on Jun. 12, 2021.

(51) Int. Cl.
H04N 21/266    (2011.01)
G06N 3/045    (2023.01)
(Continued)

(52) U.S. Cl.
CPC ..... *H04N 21/23418* (2013.01); *H04N 19/154* (2014.11); *H04N 21/4668* (2013.01)

(58) Field of Classification Search
CPC .................. H04N 21/23418; H04N 21/26603
See application file for complete search history.

(56) References Cited

U.S. PATENT DOCUMENTS

| | | | |
|---|---|---|---|
| 9,741,107 B2 | 8/2017 | Xu et al. | |
| 11,729,387 B1 * | 8/2023 | Khsib | H04N 19/124 375/240.03 |

(Continued)

FOREIGN PATENT DOCUMENTS

| | | |
|---|---|---|
| CN | 108377387 | 8/2018 |
| CN | 109961434 | 7/2019 |

(Continued)

OTHER PUBLICATIONS

Abu-El-Haija et al., "Youtube-8M: A Large-Scale Video Classification Benchmark", in Google Research, Sep. 27, 2016, pp. 1-10.

(Continued)

*Primary Examiner* — HsiungFei Peng
(74) *Attorney, Agent, or Firm* — Shumaker & Sieffert, P.A.

(57) ABSTRACT

Methods, systems, and media for determining perceptual quality indicators of video content items are provided. In some embodiments, the method comprises: receiving a video content item; extracting a plurality of frames from the video content item; determining, using a first subnetwork of a deep neural network, a content quality indicator for each frame of the plurality of frames of the video content item; determining, using a second subnetwork of the deep neural network, a video distortion indicator for each frame of the plurality of frames of the video content item; determining, using a third subnetwork of the deep neural network, a compression sensitivity indicator for each frame of the (Continued)

plurality of frames of the video content item; generating a quality level for each frame of the plurality of frames of the video content item that concatenates the content quality indicator, the video distortion indicator, and the compression sensitivity indicator for that frame of the video content item; generating an overall quality level for video content item by aggregating the quality level of each frame of the plurality of frames; and causing a video recommendation to be presented based on the overall quality level of the video content item.

21 Claims, 8 Drawing Sheets

(51) Int. Cl.
*H04N 17/02* (2006.01)
*H04N 19/154* (2014.01)
*H04N 21/234* (2011.01)
*H04N 21/434* (2011.01)
*H04N 21/44* (2011.01)
*H04N 21/466* (2011.01)

(56) References Cited

U.S. PATENT DOCUMENTS

| | | | | |
|---|---|---|---|---|
| 11,856,203 | B1* | 12/2023 | Tschannen | H04N 19/139 |
| 11,895,330 | B2* | 2/2024 | Zhang | H04N 19/105 |
| 2020/0275016 | A1 | 8/2020 | Citerin et al. | |
| 2021/0158008 | A1 | 5/2021 | Zhou et al. | |
| 2022/0101629 | A1 | 3/2022 | Liu et al. | |
| 2023/0412808 | A1* | 12/2023 | Holland | G06N 20/00 |
| 2024/0037802 | A1* | 2/2024 | Solovyev | H04N 19/105 |
| 2024/0056570 | A1* | 2/2024 | Li | H04N 19/186 |

FOREIGN PATENT DOCUMENTS

| | | |
|---|---|---|
| WO | WO 2020080698 | 4/2020 |
| WO | WO 2020134926 | 7/2020 |

OTHER PUBLICATIONS

Choudhury, A., "Robust HDR Image Quality Assessment Using Combination of Quality Metrics", in Multimedia Tools and Applications, vol. 79, May 31, 2020, pp. 22843-22867.

Fang, Y., et al., "Perceptual Quality Assessment of Smartphone Photography", In Proceedings of the IEEE/CVF Conference on Computer Vision and Pattern Recognition (CVPR), Seattle, WA, USA, Jun. 13-19, 2020, pp. 1-10.

Guo, Y., et al., "Deep Learning For Visual Understanding: A Review", In Neurocomputing, vol. 187, Apr. 26, 2016, pp. 27-48.

International Search Report and Written Opinion dated Sep. 5, 2022 in International Patent Application No. PCT/US2022/032668.

Li et al., "Quality Assessment of In-the-Wild Video", in Proceedings of the ACM International Conference on Multimedia, Nice, France, Oct. 21-25, 2019, pp. 1-9.

Li, Y., et al., "User-generated Video Quality Assessment: A Subjective and Objective Study", In Journal of Latex Class Files, vol. 14, No. 8, May 18, 2020, pp. 1-11.

Lin et al., "Kadid-10k: A Large-Scale Artificially Distorted IQA Database", in the Proceedings of the International Conference on Quality of Multimedia Experience, Berlin, Germany, Jun. 5-7, 2019, pp. 1-3.

Ma et al., "End-to-End Blind Image Quality Assessment Using Deep Neural Networks", in Transactions on Image Processing, vol. 27, No. 3, Mar. 2018, pp. 1202-1213.

Russakovsky et al., "Imagenet Large Scale Visual Recognition Challenge", in International Journal of Computer Vision, vol. 115, No. 3., Jan. 2015, pp. 1-43.

Stroud et al., "D3D: Distilled 3D Networks for Video Action Recognition", in Proceedings of the IEEE/CVF Winter Conference on Applications of Computer Vision, Aspen, CO, USA, Mar. 1-5, 2020, pp. 1-10.

van den Oord et al., "Representation Learning with Contrastive Predictive Coding", Cornell University, Jan. 22, 2019, pp. 1-13.

Wang, Y., et al., "Video Transcoding Optimization Based on Input Perceptual Quality", In Applications of Digital Image Processing XLIII, vol. 11510, Sep. 29, 2020, pp. 1-11.

Response to Extended Search Report dated Aug. 18, 2023, from counterpart European Application No. 22743969.2 filed Feb. 14, 2024, 11 pp.

Bosse et al., "Deep Neural Networks for No-Reference and Full-Reference Image Quality Assessment", IEEE Transactions on Image Processing, vol. 27, No. 1, IEEE, Jan. 2018, pp. 206-219, Retrieved from the Internet on Dec. 15, 2023 from URL: https://ieeexplore.ieee.org/abstract/document/8063957.

Office Action, and translation thereof, from counterpart Japanese Application No. 2023-558593 dated Nov. 5, 2024, 6 pp.

Zadtootaghaj et al., "DEMI: Deep Video Quality Estimation Model Using Perceptual Video Quality Dimensions", Oct. 23, 2024, 9 pp.

* cited by examiner

METHODS, SYSTEMS, AND MEDIA FOR DETERMINING PERCEPTUAL QUALITY INDICATORS OF VIDEO CONTENT ITEMS

CROSS-REFERENCE TO RELATED APPLICATION

This application claims the benefit of U.S. Provisional Patent Application No. 63/210,003, filed Jun. 12, 2021, which is hereby incorporated by reference in its entirety.

TECHNICAL FIELD

The disclosed subject matter relates to methods, systems, and media for determining perceptual quality indicators of video content items.

BACKGROUND

Users frequently stream video content items (e.g., television shows, videos, movies, music videos, etc.) on user devices from servers that host the video content items. Service providers generally optimize and stream transcoded versions of such video content items. This, however, includes both professionally created content in which the service provider receives a pristine original version of the video content item and user-generated content in which the service provider receives a non-pristine version of the video content item having pre-existing distortions or compression artifacts.

Understanding the perceptual subjective video quality of such content is a difficult and time-consuming task. For example, prior approaches to determine video quality include employing a team of individuals to manually review videos and identify visible quality issues.

Accordingly, it is desirable to provide new methods, systems, and media for determining perceptual quality indicators of video content items.

SUMMARY

Methods, systems, and media for determining perceptual quality indicators of video content items are provided.

In accordance with some embodiments of the disclosed subject matter, a method for video quality assessment is provided, the method comprising: receiving a video content item; extracting a plurality of frames from the video content item; determining, using a first subnetwork of a deep neural network, a content quality indicator for each frame of the plurality of frames of the video content item; determining, using a second subnetwork of the deep neural network, a video distortion indicator for each frame of the plurality of frames of the video content item; determining, using a third subnetwork of the deep neural network, a compression sensitivity indicator for each frame of the plurality of frames of the video content item; generating a quality level for each frame of the plurality of frames of the video content item that concatenates the content quality indicator, the video distortion indicator, and the compression sensitivity indicator for that frame of the video content item; generating an overall quality level for video content item by aggregating the quality level of each frame of the plurality of frames; and causing a video recommendation to be presented based on the overall quality level of the video content item.

In some embodiments, the content quality indicator represents semantic-level embeddings for each frame of the plurality of frames of the video content item and the first subnetwork of the deep neural network further outputs predicted content labels that describe content appearing in each frame of the plurality of frames of the video content item.

In some embodiments, the video distortion indicator represents distortion-sensitive embeddings for each frame of the plurality of frames of the video content item and the second subnetwork of the deep neural network further outputs detected distortion types that describe distortion detected in each frame of the plurality of frames of the video content item.

In some embodiments, the compression sensitivity indicator represents compression-sensitive embeddings for each frame of the plurality of frames of the video content item and the third subnetwork of the deep neural network further outputs a compression level score.

In some embodiments, the overall quality level is generated using a convolutional neural network that outputs per chunk scores for each frame of the plurality of frames of the video content item and that averages the per chunk scores.

In some embodiments, the video recommendation includes a recommendation to further compress the video content item based on the overall quality level.

In some embodiments, the video recommendation includes a recommendation to an uploader of the video content item to modify a portion of the video content item based on the quality level associated with that frame of the video content item.

In accordance with some embodiments of the disclosed subject matter, a system for video quality assessment is provided, the system comprising a hardware processor that is configured to: receive a video content item; extract a plurality of frames from the video content item; determine, using a first subnetwork of a deep neural network, a content quality indicator for each frame of the plurality of frames of the video content item; determine, using a second subnetwork of the deep neural network, a video distortion indicator for each frame of the plurality of frames of the video content item; determine, using a third subnetwork of the deep neural network, a compression sensitivity indicator for each frame of the plurality of frames of the video content item; generate a quality level for each frame of the plurality of frames of the video content item that concatenates the content quality indicator, the video distortion indicator, and the compression sensitivity indicator for that frame of the video content item; generate an overall quality level for video content item by aggregating the quality level of each frame of the plurality of frames; and cause a video recommendation to be presented based on the overall quality level of the video content item.

In accordance with some embodiments of the disclosed subject matter, a non-transitory computer-readable medium containing computer executable instructions that, when executed by a processor, cause the processor to perform a method for video quality assessment is provided, the method comprising: receiving a video content item; extracting a plurality of frames from the video content item; determining, using a first subnetwork of a deep neural network, a content quality indicator for each frame of the plurality of frames of the video content item; determining, using a second subnetwork of the deep neural network, a video distortion indicator for each frame of the plurality of frames of the video content item; determining, using a third subnetwork of the deep neural network, a compression sensitivity indicator for each frame of the plurality of frames of the video content item; generating a quality level for each frame of the plurality of frames of the video content item that concatenates the content quality indicator, the video distortion indicator, and the compression sensitivity indicator for that frame of the video content item; generating an overall quality level for video content item by aggregating the quality level of each frame of the plurality of frames; and causing a video recommendation to be presented based on the overall quality level of the video content item.

In accordance with some embodiments of the disclosed subject matter, a system for video quality assessment is provided, the system comprising: means for receiving a video content item; means for extracting a plurality of frames from the video content item; means for determining, using a first subnetwork of a deep neural network, a content quality indicator for each frame of the plurality of frames of the video content item; means for determining, using a second subnetwork of the deep neural network, a video distortion indicator for each frame of the plurality of frames of the video content item; means for determining, using a third subnetwork of the deep neural network, a compression sensitivity indicator for each frame of the plurality of frames of the video content item; means for generating a quality level for each frame of the plurality of frames of the video content item that concatenates the content quality indicator, the video distortion indicator, and the compression sensitivity indicator for that frame of the video content item; means for generating an overall quality level for video content item by aggregating the quality level of each frame of the plurality of frames; and means for causing a video recommendation to be presented based on the overall quality level of the video content item.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
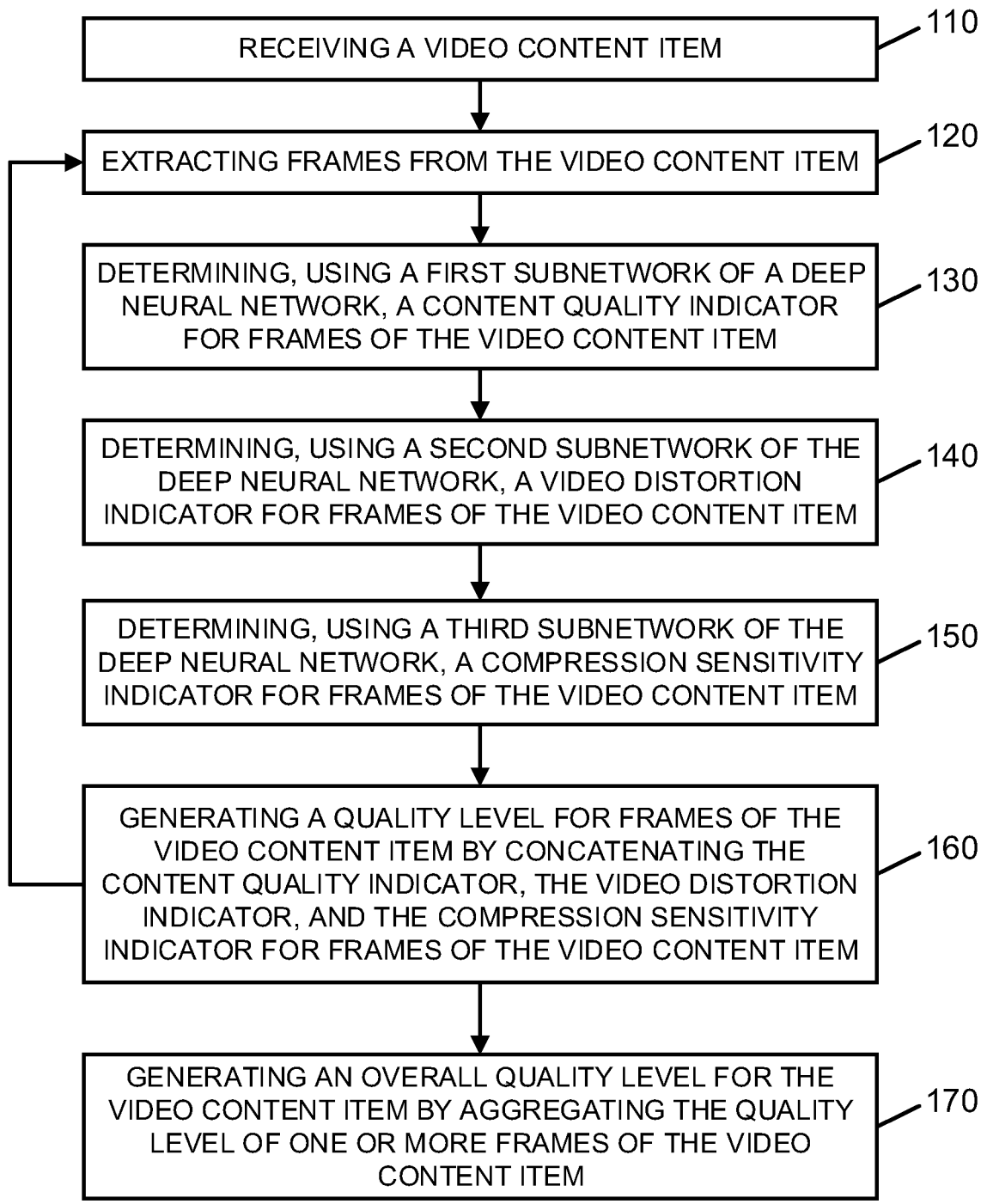
FIGS. 1 and 2 show an illustrative example of a process for determining perceptual quality indicators of video content items in accordance with some embodiments of the disclosed subject matter.

In accordance with various embodiments, mechanisms (which can include methods, systems, and media) for determining perceptual quality indicators of video content items are provided. More particularly, the mechanisms described herein can decompose overall perceptual quality of a video content item in terms of semantic content, distortion or technical quality, and compression level.

In accordance with some embodiments, the mechanisms described herein can determine the overall perceptual quality of a video content item, such as a user-generated video, from multiple aspects, such as by determining semantic content, distortion or technical quality, and compression level of the video content item. For example, the mechanisms can provide one or more input frames of a video content item as an input to multiple subnetworks of a deep neural network, where each of the subnetworks can extract deep features and quality indicators from each of the frames of the video content item. In a more particular example, the mechanisms can provide one or more input frames of a video content item to (1) a content subnetwork that predicts content labels and a content quality indicator of one or more frames of the video content item, (2) a distortion subnetwork that determines distortion types and a video distortion indicator of one or more frames of the video content item, and (3) a compression subnetwork that predicts a compression level and a compression sensitivity indicator of one or more frames of the video content item.

In some embodiments, the extracted features from each of the subnetworks of the deep neural network can be used to provide quality indicators that may be understandable or digestible by a user (e.g., an uploading user, a content provider user, etc.). For example, the content subnetwork can generate predicted content labels that represent the frame semantics in the one or more input frames, such as "outdoor recreation," "game," "ball," and "walking." In another example, the distortion subnetwork can generate predicted distortion types that represent the distortion detected in the one or more input frames, such as "jitter," "color quantization," "lens blur," and "denoise." In yet another example, the compression subnetwork can generate compression-sensitive embedding features that describe the compression level in the one or more input frames. In response to providing content labels and/or distortion labels as feedback to a user, the user can be provided with an opportunity to modify that portion of the video content item. For example, the user may understand the content quality indicator determined for the frame based on the content labels for that frame and whether such content labels are deemed to be interesting content. In another example, the user may understand the video distortion indicator for the frame based on the distortion types detected within that frame.

In some embodiments, the mechanisms can concatenate the quality indicators for each of the frames of the video content item together and aggregate them using an aggregation subnetwork to obtain an overall video quality estimation of the video content item. For example, as a video content item can be a sequence of chunks or frames in which those chunks or frames may have different perceptual quality, the mechanisms can concatenate the quality indicators for each of the frames of the video content item and can aggregate the concatenated quality indicators to obtain an overall video quality estimation of the video content item.

It should be noted that the quality indicators of one or more frames and the overall video quality estimation can be used in any suitable application.

For example, the mechanisms can allow a service provider to use the overall video quality estimation to make an informed quality of service trade-off (e.g., transmit the video content item at a relatively higher or lower resolution or at a relatively higher or lower bitrate). In continuing this example, a service provider can perform adjusted bitrate streaming of video content items being transmitted to a user device based on the overall video quality estimation of each of the video content items and/or based on the quality indicators of the one or more frames of each of the video content items.

In another example, the mechanisms can use the quality indicators associated with each frame of the video content item to determine that a viewer of a first portion of the video content item having a higher quality indicator may benefit from being transmitted at a format having a relatively higher resolution (e.g., a pristine content) and that a second portion of the video content item having a lower quality indicator can be provided at a format having a relatively lower resolution with little perceptual impact on that portion of the video content item.

In yet another example, the mechanisms can provide an understanding of the quality of the video content item to a service provider such that the service provider can optimize a recommendation system (e.g., if multiple videos are present at a single event) or to further compress video content items having a low quality score with little perceptual impact on the video content item being presented to a viewer. In continuing this example, the mechanisms can allow a service provider to determine whether a format is to be changed from a first format to a potential second format based on the overall video quality estimation, such as a difference in the overall video quality estimation between a video content item and a subsequent video content item.

In a further example, the mechanisms can use the extracted features and quality indicators of one or more frames to provide feedback on the video content item to an uploading user, where the extracted features (e.g., content labels of "dance" and "musical ensemble" and distortion types of "gaussian blur" and "color saturation") can provide the uploading user with labels as to the perceptual quality of one or more frames of the video content item. In turn, the uploading user can modify the video content item for uploading to a content sharing service (e.g., removing or reducing a distortion type detected in one or more frames of the video content item to improve the overall perceptual quality of the video content item).

These and other features for determining perceptual quality indicators of video content items are described further in connection with FIGS. 1-8.

Turning to FIG. 1, an illustrative example 100 of a process for determining perceptual quality indicators of video content items is shown in accordance with some embodiments of the disclosed subject matter. In some embodiments, blocks of process 100 can be executed by any suitable device, such as a server that hosts media content items and streams media content items to user devices. In some such embodiments, the server can execute blocks of process 100 to extract quality scores and/or quality indicators from one or more frames of a video content item and determine an overall video quality estimation of the video content item.

Process 100 can begin at 110 by receiving an uploaded video content item. In some embodiments, process 100 can receive the video content item from any suitable source. For example, in some embodiments, a video assessment server can receive an uploaded video from a server associated with a video sharing service that receives videos created by and/or generated by users. In some embodiments, an uploaded video content item can include any suitable content (e.g., video content, audio content corresponding to the video content, captions, and/or any other suitable content). In some embodiments, an uploaded video can be associated with any suitable information provided by a user who uploads the video, such as a title of the video, a name of a creator of the video, a date the video was created, a topic of the video, and/or any other suitable information.

Alternatively, in some embodiments, process 100 can begin at 110 by receiving an indication of a video content item to be presented. In some embodiments, the indication can be received in any suitable manner. For example, in some embodiments, a link or an icon that represents the video can be selected from a page that indicates available video content items (e.g., a homepage of a video content service, a page that shows recommendations personalized to a user of the user device, and/or any other suitable page). Note that, in some embodiments, the indication can be received by a user device that is paired with a display device that is to be used to present the video. For example, in some embodiments, the indication can be received by a mobile phone or a virtual assistant device that is paired with or otherwise associated with a television.

At 120, process 100 can extract one or more frames from the video content item. For example, in response to receiving a video content item at 110, the video content item can be separated into its video frames at 120 and each frame can be inputted into a deep neural network for determining the overall perceptual quality of the video content item in terms of semantic content, distortion or technical quality, and compression level.

It should be noted that each subnetwork of the deep neural network can receive different input frames. For example, a content subnetwork of the deep neural network can receive an extracted frame (e.g., sampled at one frame per second) that has been resized to reduce its resolution. In another example, a distortion subnetwork of the deep neural network can receive an extracted frame (e.g., sampled at one frame per second) at its native resolution (e.g., to avoid rescaling artifacts). In yet another example, a compression subnetwork of the deep neural network can receive multiple frames (e.g., sampled at five frames per second) at their native resolution (e.g., to capture both spatial and temporal artifacts).

In some embodiments, at 130, process 100 can provide the one or more frames of the video content item as an input to a content subnetwork of the deep neural network to determine one or more content labels and a content quality indicator. It should be noted that process 100 can sample frames at one frame per second from the video content item, resize the frame to a lower resolution (e.g., as the output of the content subnetwork should not be affected by the input resolution), and provide the resized frame as an input to the content subnetwork of the deep neural network. It should also be noted that the content quality indicator predicted by the content subnetwork of the deep neural network can encode the meaningfulness and attractiveness of the video content, which may affect the viewer's attention as well as the viewer's quality sensitivity.

Figure 2:
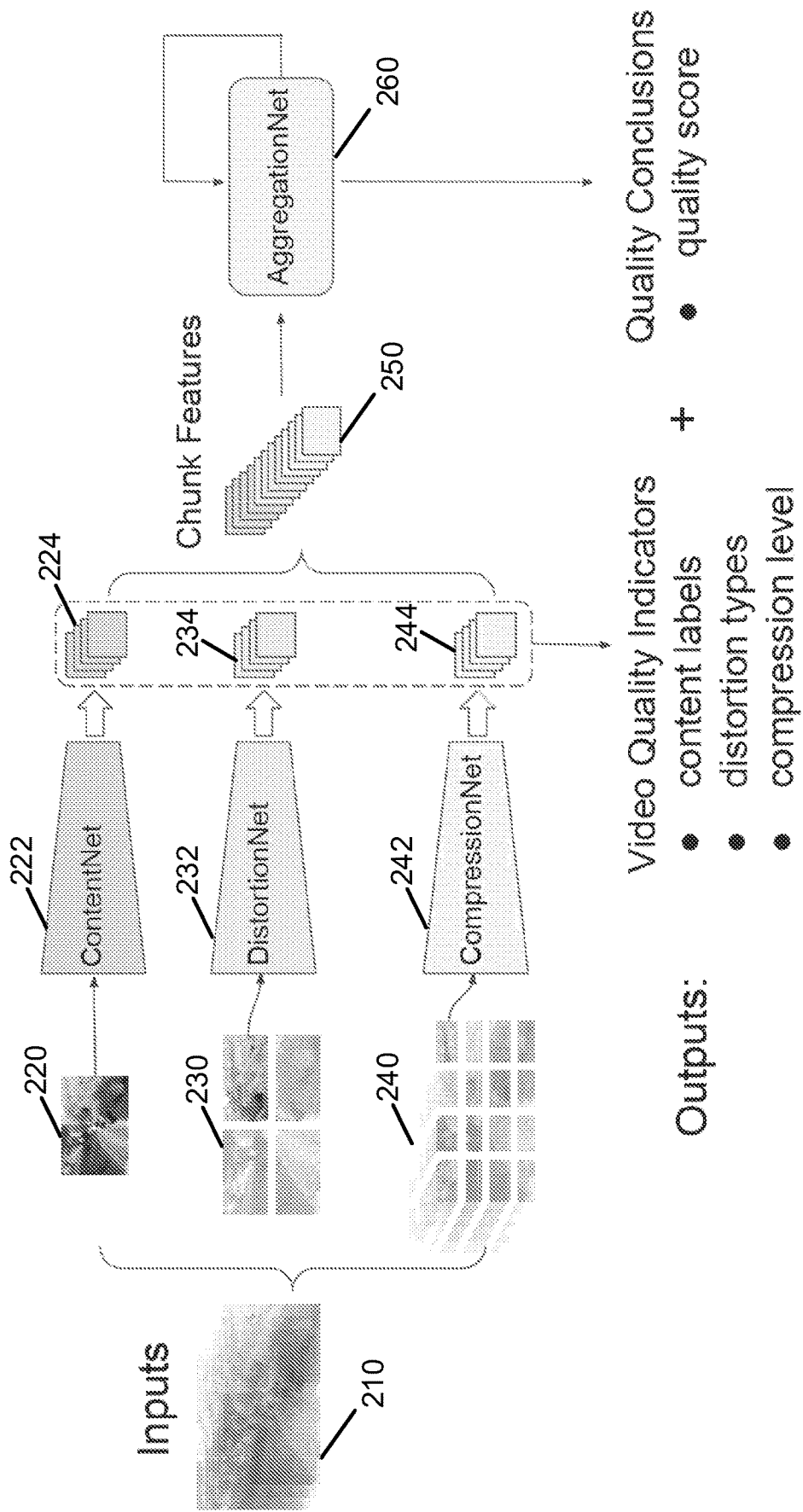

This is also shown in FIG. 2 in which a frame 220 from multiple extracted frames 210 of a video content item can be input into a content subnetwork 222 and in which content subnetwork 222 can provide an output 224 that includes predicted content labels and a predicted content quality indicator for frame 220.

It should be noted that the content subnetwork can be any suitable video classification model for predicting one or more content labels and a content quality indicator for a frame of the video content item. For example, the content subnetwork of the deep neural network can be a video classification model that provides semantic-level embeddings, where the video classification model can be trained on single video frames and where the video classification model can output content-sensitive embedding features and predicted content labels. In a more particular example, the content subnetwork can customize a baseline convolutional neural network by adding a fully connected layer with output feature maps of a certain size (e.g., 16, 16, 100) before the last layer and changing the output of the last layer to correspond to the total number of video classes (e.g., 3,862 logits to correspond with the YouTube-8M dataset having 3,862 coarse and fine-grained entities). In continuing this example, the input frames can be sampled (e.g., at 1 frame per second) and resized into a smaller resolution (e.g., to 496×496), and a cross-entropy loss can be used to fine-tune the baseline convolution neural network in a multi-label mode. It should be noted that the input frames may have any suitable number of content labels (e.g., up to 20 content labels).

Figure 3:
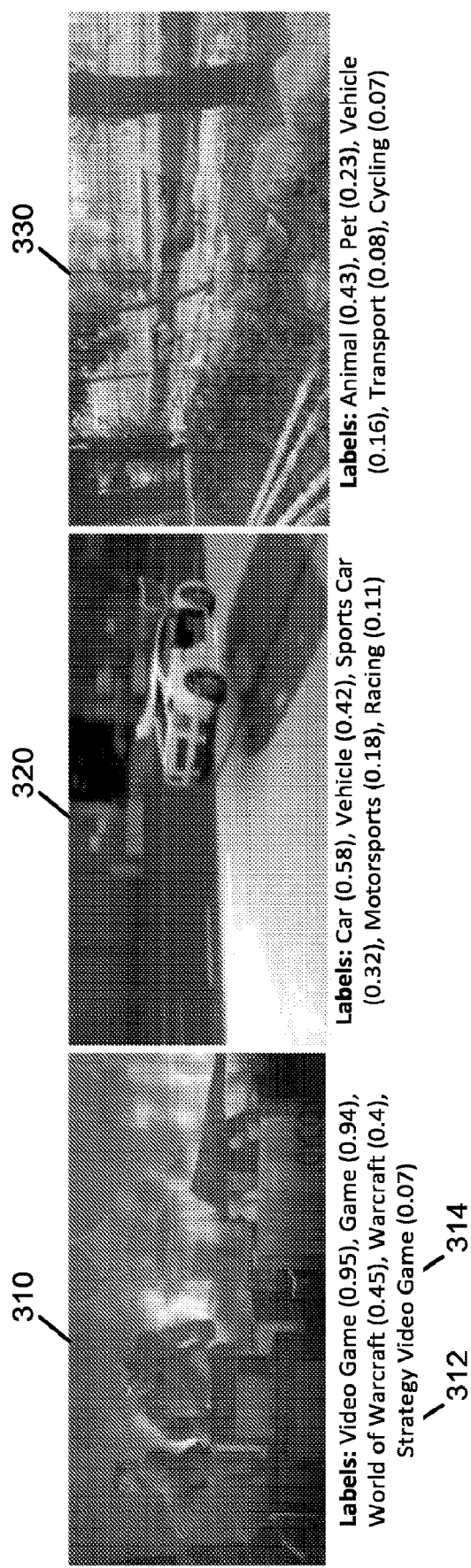
FIG. 3 shows an illustrative example of predicted content labels that represent the frame semantics for one or more frames of each video content item in accordance with some embodiments of the disclosed subject matter.

An illustrative example of predicted content labels that represent the frame semantics for one or more frames of each video content item in accordance with some embodiments of the disclosed subject matter is shown in FIG. 3. As shown in FIG. 3, each frame 310, 320, and 330 from different video content items can be presented in an interface along with predicted content labels and their associated probabilities. For example, each frame 310, 320, and 330 can be presented with the top five class predictions 312 and probabilities 314 for each frame—e.g., the content label "Video Game" and a probability of 0.95, the content label "Game" and a probability of 0.94, the content label "World of Warcraft" and a probability of 0.45, the content label "Warcraft" and a probability of 0.40, and the content label "Strategy Video Game" and a probability of 0.07.

Figure 6:
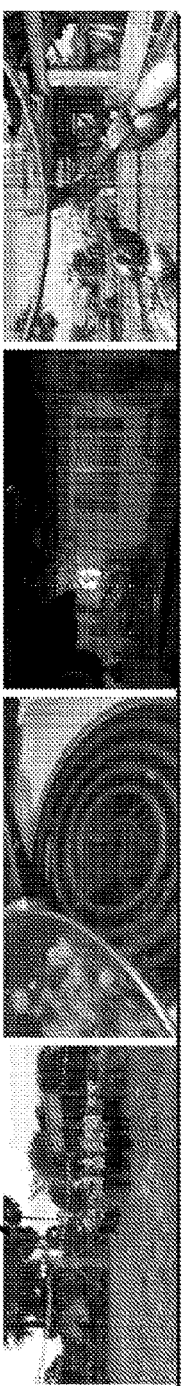
FIG. 6 shows an illustrative example of an interface that presents perceptual quality indicators of video content items (e.g., compression level, content labels, and distortion types), a predicted quality score for a frame or feature of each video content item, and an overall quality score for the frames or features of each video content item in accordance with some embodiments of the disclosed subject matter.

An illustrative example of predicted content labels that represent the frame semantics for a frame of a video content item along with a content quality indicator for that frame of the video content item in accordance with some embodiments of the disclosed subject matter is shown in FIG. 6. As shown in FIG. 6, an interface can be presented that includes a representative frame 610 of a video content item, the predicted content labels 620 that describe the content appearing within frame 610 (e.g., "dance," "musical ensemble," and "outdoor recreation"). As also shown in FIG. 6, the interface can also include a content quality indicator (CT) 630 for frame 610. As described above, content quality indicator 630 calculated by the content subnetwork of the deep neural network can encode the meaningfulness and attractiveness of the video content, which may affect the viewer's attention as well as the viewer's quality sensitivity. For example, the content subnetwork of the deep neural network has determined a content quality indicator of 3.621 for representative frame 610 of the video content item, which indicates that frame 610 that includes "dance," "music ensemble," and "outdoor recreation" is deemed to be interesting content.

Turning back to FIG. 1, in some embodiments, at 140, process 100 can provide the one or more frames of the video content item as an input to a distortion subnetwork of the deep neural network to determine one or more distortion types and a video distortion indicator. It should be noted that the video content item, such as a user-generated video, may contain various distortions (e.g., contrast change or denoise), which are orthogonal to video content features, and may have a good or bad impact on perceptual quality. For example, distortions may be introduced during the video production process in which some distortions are intended (e.g., proper sharpness filters or fine-tuning color saturation) and may have a positive impact on perceptual quality. Conversely, unintended distortions, such as motion blur or jitter, may have a negative impact on perceptual quality. The video distortion indicator can encode the quality of the frame based on distortions contained within the frame.

It should be noted that process 100 can sample frames at one frame per second from the video content item and provide the frame at its native resolution as an input to the distortion subnetwork of the deep neural network (e.g., to avoid rescaling artifacts).

This is also shown in FIG. 2 in which a frame 230 from multiple extracted frames 210 of a video content item can be input into a distortion subnetwork 232 and in which distortion subnetwork 232 can provide an output 234 including predicted distortion types and a predicted video distortion indicator for frame 230.

It should be noted that the distortion subnetwork can be trained on synthetically distorted images, such as from the KADIS-700K dataset and the KADID-10K dataset. Such datasets can provide pristine original images and multiple distortion filters, such as high sharpen, denoise, and Gaussian blur, where each filter can generate distortions in five different levels (e.g., each original has 125 distorted variants). In continuing this example, the training loss function can contain the three parts of cross-entry loss ($L_T^{DT}$) for multi-label (distortion type) classification, pairwise hinge loss ($L_P^{DT}$) between two randomly selected variants with the same distortion type, and L2 distance loss ($L_M^{DT}$). In particular, the combination of cross-entry loss and pairwise hinge loss ($L_T^{DT}+L_P^{DT}$) can be used as the loss to train the initial distortion subnetwork. The distortion subnetwork can then be fine-tuned using the KADID-10K dataset. As the KADID-10K dataset provides ground truth mean opinion scores (MOS), process 100 can use a separate multilayer perceptron head to predict the mean opinion score and to train with a L2 distance loss ($L_M^{DT}$). Accordingly, the total loss function for training the distortion subnetwork on KADID-10K can be represented as:

$$L^{DT}=L_T^{DT}+L_P^{DT}+L_M^{DT}.$$

Figure 4:
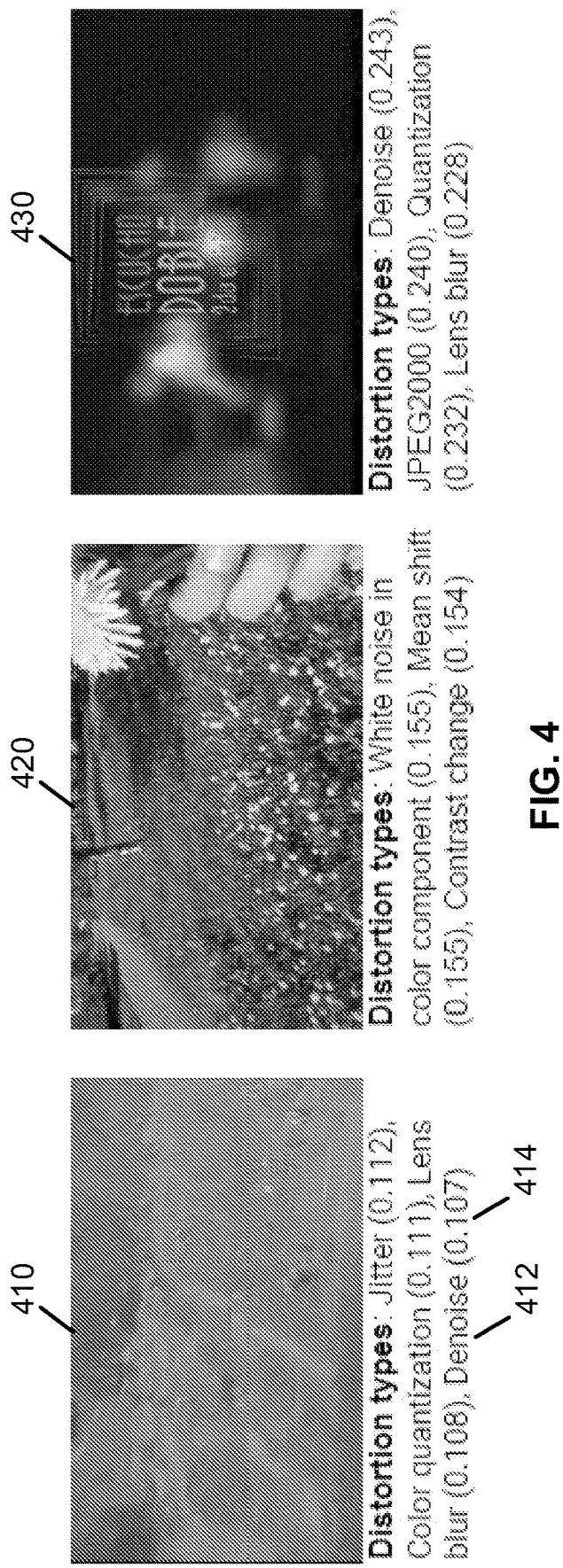
FIG. 4 shows an illustrative example of predicted distortion types that have been detected in one or more frames of each video content item in accordance with some embodiments of the disclosed subject matter.

An illustrative example of distortion types that have been detected in one or more frames of each video content item in accordance with some embodiments of the disclosed subject matter is shown in FIG. 4. As shown in FIG. 4, each frame 410, 420, and 430 from different video content items can be presented in an interface along with predicted distortion types and their associated probabilities. For example, each frame 410, 420, and 430 can be presented with the detected distortion types 412 for each frame—e.g., the distortion type "jitter," the distortion type "color quantization," the distortion type "lens blur," and the distortion type "denoise" for frame 410; the distortion type "white noise in color component," the distortion type "mean shift," and the distortion type "contrast change" for frame 420; and the distortion type "denoise," the distortion type "JPEG2000," the distortion type "quantization," and the distortion type "lens blur" for frame 430.

An illustrative example of predicted distortion types that have been detected for a frame of a video content item along with a video distortion indicator for that frame of the video content item in accordance with some embodiments of the disclosed subject matter is also shown in FIG. 6. As shown in FIG. 6, an interface can be presented that includes a representative frame 610 of a video content item and the predicted distortion types 640 that have been detected within frame 610 (e.g., "Gaussian blur," "multiplicative noise," and "color saturation"). As also shown in FIG. 6, the interface can also include a video distortion indicator (DT) 650 for frame 610. As described above, video distortion indicator 650 calculated by the distortion subnetwork of the deep neural network can encode distortion-sensitive embedding features. It should be noted that video distortion indicator 650 can be based on any suitable scale (e.g., a scale of 1 through 5, where 1 is the lowest quality and 5 is the highest quality). For example, the distortion subnetwork of the deep neural network has determined a video distortion indicator of 3.16 for representative frame 610 of the video content item, which indicates that frame 610 that includes "Gaussian blur," "multiplicative noise," and "color saturation" is deemed to lead to a poor watching experience. In a more particular example, the distortion subnetwork of the deep neural network can determine correlations between content and quality—e.g., 52 video clips have the content label "strategy video game" in which 65% of those video clips are in the high quality range whereas 7 video clips have the content label "forest" in which 72% of those video clips are in the low quality range. As such, the video distortion indicator 650 calculated by the distortion subnetwork of the deep neural network can be based on the content labels that describe the content appearing within frame 610.

Turning back to FIG. 1, in some embodiments, at 150, process 100 can provide the one or more frames of the video content item as an input to a compression subnetwork of the deep neural network to determine one or more compression level and a compression sensitivity indicator. It should be noted that a content sharing platform may transcode the original video content item, such as a user-generated video, into different bitrates and/or resolutions in order to meet device and/or network requirements. For example, compression artifacts may be introduced by a third-party, such as an uploading application of the content sharing platform. It should also be noted that video compression strategies may often cause noticeable quality degradation. As such, the compression subnetwork can, in some embodiments, learn compression-related features, where the outputs of the compression subnetwork can include compression-sensitive embedding features and a continuous compression level score or compression sensitivity indicator.

It should be noted that the compression sensitivity indicator can be on any suitable scale. For example, the compression sensitivity indicator can be a score in the range of 0 to 1, where 0 can represent no compression and where 1 can represent heavy compression.

It should also be noted that process 100 can sample multiple frames at five frames per second from the video content item (e.g., to capture both spatial and temporal artifacts) and provide the frames at their native resolution as an input to the compression subnetwork of the deep neural network (e.g., to avoid rescaling artifacts).

This is also shown in FIG. 2 in which frame 240 from multiple extracted frames 210 of a video content item can be input into a compression subnetwork 242 and in which compression subnetwork 242 can provide an output 244 including a predicted compression level and a predicted compression sensitivity indicator for frames 240. As shown in FIG. 2, it should be noted that the inputs into each subnetwork can be different—e.g., content subnetwork 222 can receive an entire frame to run overall semantic classification, distortion subnetwork 232 can receive a single frame, and compression subnetwork 242 can receive multiple frames to capture both spatial and temporal artifacts. It should also be noted that, as shown with frames 230 and frames 240 in FIG. 2, frames can be split into disjoint patches for feature extraction and patch features can then be stitched together to obtain features for the entire frame.

It should be noted that the compression subnetwork can be trained using a self-supervised learning approach or any other suitable approach. For example, the compression subnetwork can be trained by a distilled 3D model, which was pretrained on a large-scale video classification dataset, to learn both spatial and temporal video features. An illustrative example of a large-scale video classification dataset is the Kinetics-600 dataset that includes approximately 500,000 10-second video clips that have been annotated with one of 600 action categories.

For example, a set of videos can be transcoded using a VP9 encoder into multiple variants, such as a video-on-demand (VOD) version, a video-on-demand with lower bitrate (VODLB) version, and a constant bit rate (CBR) version, where a VOD version can have a better quality than a VODLB version due to the higher target bitrate and where a CBR version can have the lowest quality as one-pass transcoding is less optimized than two-pass transcoding. Frames can then be uniformly sampled from the original and transcoded clips and fed into the distilled 3D model to obtain a predicted compression level. A (1, 4, 4, 100) feature layer, which can be inserted before the fully connected layer, can be used to extract compression-sensitive embedding features.

In continuing this example, it should be noted that the training loss function for training the compression subnetwork can contain the two parts of pairwise loss ($L_P^{CP}$) and contrastive loss ($L_C^{CP}$). In particular, pairwise loss can be computed to evaluate the compression level difference between the original version and the constant bit rate version, which loss can be represented as:

$$L_P^{CP} = \text{sigmoid}((orig-cbr)*K), \text{ where } K=4.$$

Contrastive loss can be computed by projecting the features into a 1D space (1×1600) by two dense layers (to form a nonlinear mapping) and defining the similarity (sim (x,y)) between the two features by their feature distance. Contrastive loss can be represented as:

$$L_C^{CP} = \frac{sim(orig, vod)}{sim(orig, vod) + sim(orig, cbr) + sim(vod, cbr)}$$

Accordingly, the total loss function for training the compression subnetwork can be represented as:

$$L^{CP} = L_P^{CP} + L_C^{CP}.$$

Figure 5:
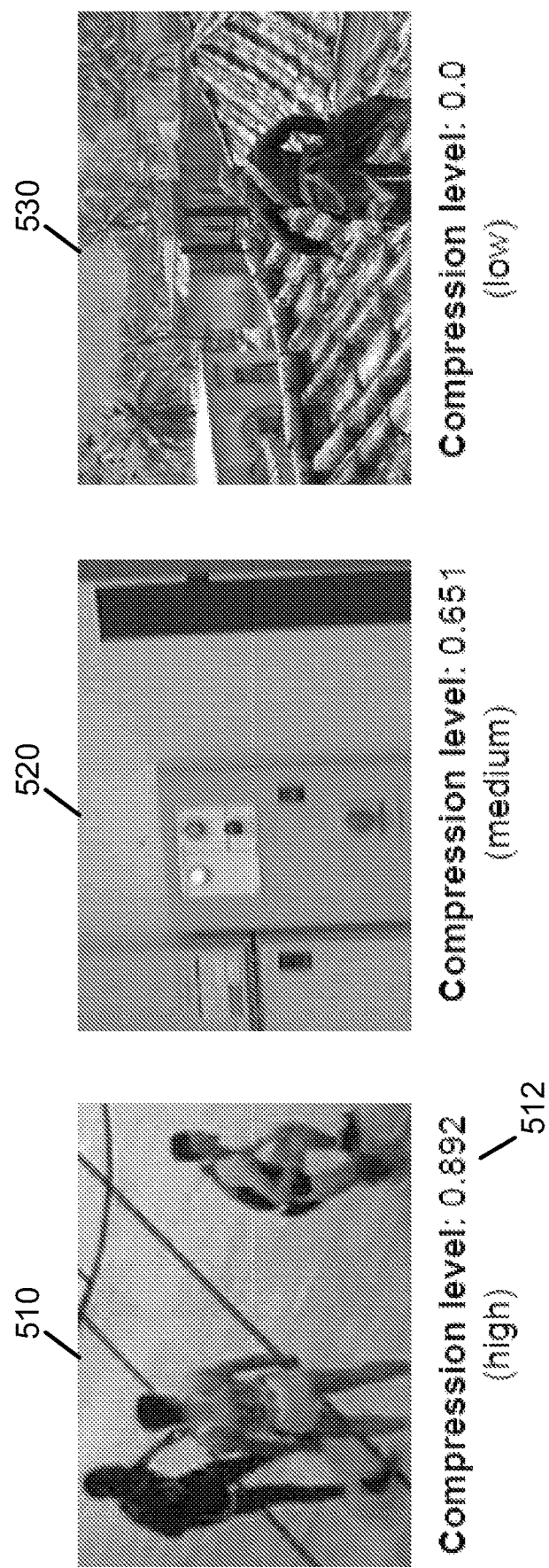
FIG. 5 shows an illustrative example of predicted compression levels in one or more frames of each video content item in accordance with some embodiments of the disclosed subject matter.

An illustrative example of compression levels that have been detected in the multiple frames of each video content item in accordance with some embodiments of the disclosed subject matter is shown in FIG. 5. As shown in FIG. 5, a representative frame 510, 520, and 530 from different video content items can be presented in an interface along with a compression level score in the range of 0 (that represents no compression) to 1 (that represents heavy or high compression). For example, each representative frame 510, 520, and 530 can be presented with a predicted compression level score 512—e.g., the compression level score 0.892 for representative frame 510, which indicates a high compression level. In another example, additionally or alternatively to compression level score 512, each representative frame 510, 520, and 530 can be presented along with a textual description of the compression level, such as low compression level, medium compression level, or high compression level.

An illustrative example of predicted compression level along with a compression sensitivity indicator for the inputted frames of the video content item in accordance with some embodiments of the disclosed subject matter is also shown in FIG. 6. As shown in FIG. 6, an interface can be presented that includes a representative frame 610 of a video content item and the predicted compression level of 0.924 for the portion of the video content item represented by frame 610. As also shown in FIG. 6, the interface can also include a compression sensitivity indicator (CP) 670 for the portion of the video content item represented by frame 610. As described above, compression sensitivity indicator 670 calculated by the compression subnetwork of the deep neural network can encode compression-sensitive embedding features. It should be noted that compression sensitivity indicator 670 can be based on any suitable scale (e.g., a scale of 1 through 5, where 1 is the lowest quality and 5 is the highest quality). For example, the compression subnetwork of the deep neural network has determined a compression sensitivity indicator of 2.862 for representative frame 610 of the video content item, which indicates that frame 610 that has a high compression level of 0.924 is deemed to lead to a poor watching experience. That is, while frame 610 is deemed to contain interesting content of "dance" and "outdoor recreation" with a content quality indicator of 3.621, process 100 can determine that frame 610 is highly compressed with a compression sensitivity indicator of 2.862 and contains distortions like blur and noise with a video distortion indicator of 3.16, which may lead to a poor watching experience.

Turning back to FIG. 1, in some embodiments, in response to obtaining the content quality indicator, the video distortion indicator, and the compression sensitivity indicator for frames of the video content item, process 100 can generate a quality level for frames of the video content item by concatenating the content quality indicator, the video distortion indicator, and the compression sensitivity indicator at 160. In some embodiments, process 100 can calculate a quality level for particular frames of the video content item by averaging the content quality indicator, the video distortion indicator, and the compression sensitivity indicator. In some embodiments, process 100 can calculate a quality level for particular frames of the video content item by applying any suitable weight to each of the content quality indicator, the video distortion indicator, and the compression sensitivity indicator.

In some embodiments, at 170, process 100 can generate an overall quality level for the video content item by aggregating the extracted features to obtain an overall video quality estimation. For example, in some embodiments, process 100 can calculate an overall quality level for the video content item by averaging the frame quality scores determined at 160 over the frames of the video content item. In another example, in some embodiments, process 100 can determine an overall quality level using an aggregation subnetwork of the deep neural network. The aggregation subnetwork can be an average pooling (Avg Pool) model, a long short-term model (LSTM), a convolutional long short-term model (ConvLSTM), or any other suitable temporal model. In a more particular example shown in FIG. 2, in the average pooling model of the aggregation subnetwork 260, the overall quality level can be generated using a convolutional neural network that outputs per chunk scores for each frame of the plurality of frames of the video content item and that averages the per chunk scores. In the average pooling model, each chunk feature 250 can be filtered by a 1×1 2D convolution layer (256 units) to refine the feature space. Those refined features can then be sent through a shared 2D head (which can include BatchNormalization, rectified linear activation function (Activation(relu)), global max pooling (GlobalMaxPool2D), dropout, and/or dense layers) to obtain per chunk scores. The average of the per chunk scores can be determined to be the overall quality level for the video content item.

An illustrative example of an overall quality level for one or more video content items in accordance with some embodiments of the disclosed subject matter is also shown in FIG. 6. As shown in FIG. 6, an interface can be presented that includes a representative frame 610 of a video content item and the overall quality level (CP+CT+DT) 680 of 2.955 for the video content item represented by frame 610. It should be noted that a score of 2.955 can indicate a low perceptual quality of the video content item, which may lead to a poor watching experience.

It should be noted that the quality indicators of one or more frames and the overall video quality estimation can be used in any suitable application.

For example, process 100 can transmit overall video quality estimation to a service provider, which can allow the service provider to use the overall video quality estimation to make an informed quality of service trade-off (e.g., transmit the video content item at a relatively higher or lower resolution or at a relatively higher or lower bitrate). In continuing this example, a service provider can perform adjusted bitrate streaming of video content items being transmitted to a user device based on the overall video quality estimation of each of the video content items and/or based on the quality indicators of the one or more frames of each of the video content items.

In another example, process 100 can transmit overall video quality estimation to a service provider, which can allow the service provider to use the quality indicators associated with each frame of the video content item to determine that a viewer of a first portion of the video content item having a higher quality indicator may benefit from being transmitted at a format having a relatively higher resolution (e.g., a pristine content) and that a second portion of the video content item having a lower quality indicator can be provided at a format having a relatively lower resolution with little perceptual impact on that portion of the video content item.

In yet another example, process 100 can transmit overall video quality estimation to a service provider, which can provide an understanding of the quality of the video content item such that the service provider can optimize a recommendation system (e.g., if multiple videos are present at a single event) or to further compress video content items having a low quality score with little perceptual impact on the video content item being presented to a viewer. In continuing this example, process 100 can allow a service provider to determine whether a format is to be changed from a first format to a potential second format based on the overall video quality estimation, such as a difference in the overall video quality estimation between a video content item and a subsequent video content item.

In a further example, process 100 can use the extracted features and quality indicators of one or more frames to provide feedback on the video content item to an uploading user, where the extracted features (e.g., content labels of "dance" and "musical ensemble" and distortion types of "gaussian blur" and "color saturation") can provide the uploading user with labels as to the perceptual quality of one or more frames of the video content item. In turn, the uploading user can modify the video content item for uploading to a content sharing service (e.g., removing or reducing a distortion type detected in one or more frames of the video content item to improve the overall perceptual quality of the video content item).

Figure 7:
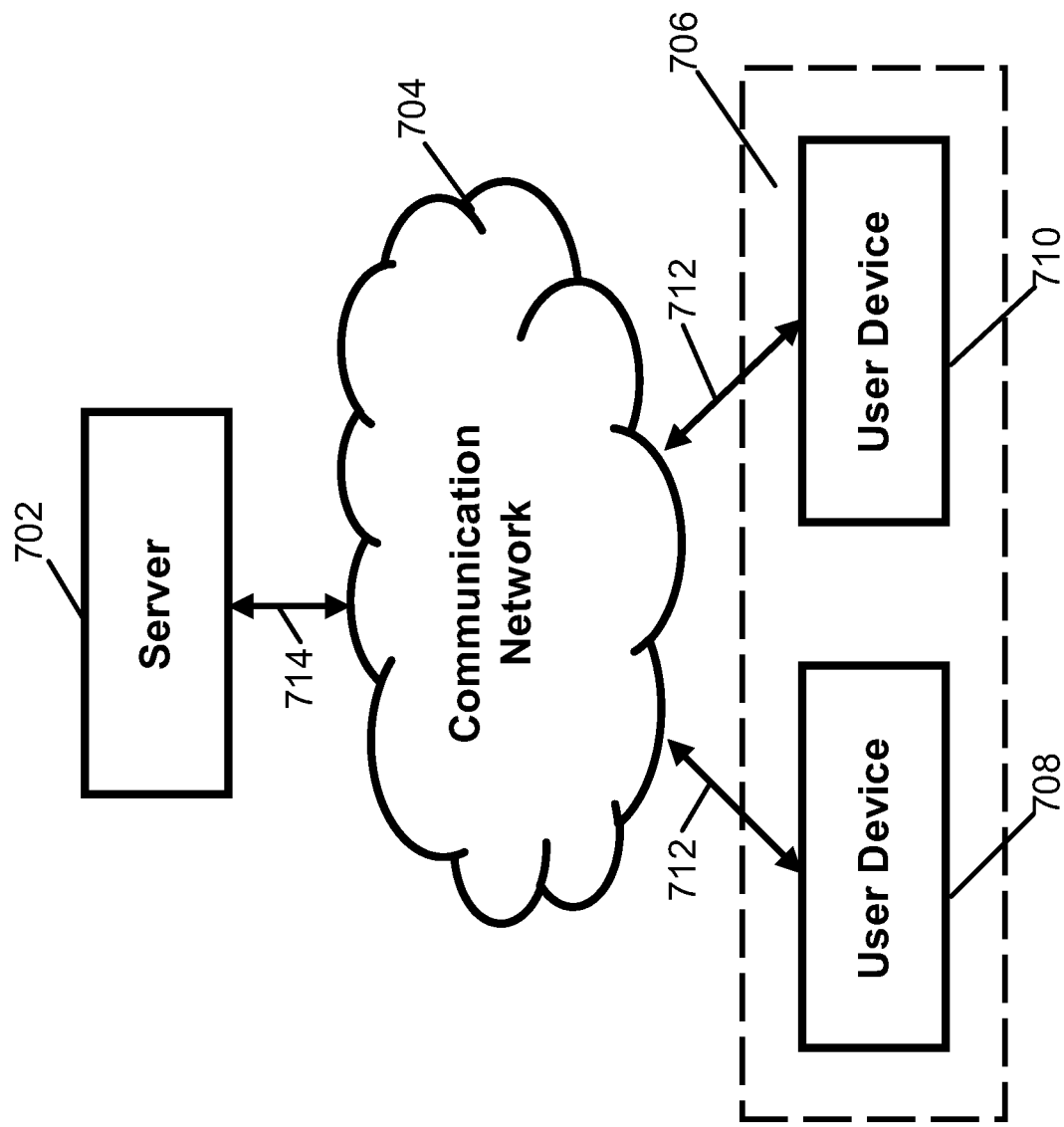
FIG. 7 shows a schematic diagram of an illustrative system suitable for implementation of mechanisms described herein for determining perceptual quality indicators of video content items in accordance with some embodiments of the disclosed subject matter.
Figure 8:
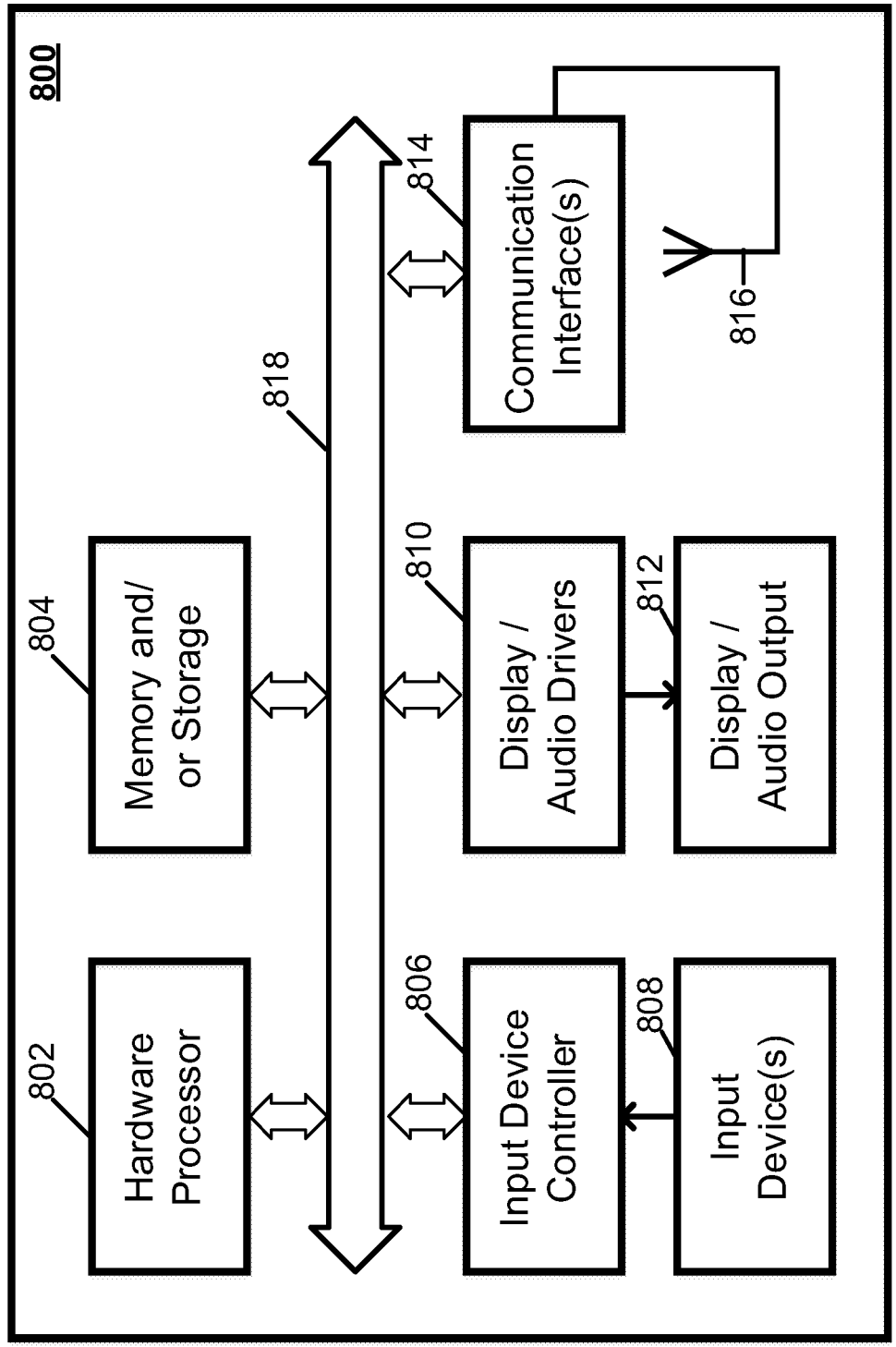
FIG. 8 shows a detailed example of hardware that can be used in a server and/or a user device of FIG. 7 in accordance with some embodiments of the disclosed subject matter.

Turning to FIG. 7, an illustrative example 700 of hardware for determining perceptual quality indicators of video content items that can be used in accordance with some embodiments of the disclosed subject matter is shown. As illustrated, hardware 700 can include a server 702, a communication network 704, and/or one or more user devices 706, such as user devices 708 and 710.

Server 702 can be any suitable server(s) for storing information, data, programs, media content, and/or any other suitable content. In some embodiments, server 702 can perform any suitable function(s). For example, in some embodiments, server 702 can determine, for a video content item being uploaded, an overall quality level of the uploaded video content item along with content labels for the content appearing within frames of the video content item, distortion types detected within frames of the video content item, a compression level for frames of the video content item, as described above in connection in FIG. 1. In continuing this example, server 702 can then optimize its recommendation systems based on the overall quality level. Server 702 can also determine whether to further compress low quality original videos with little or no perceptual impact on the final result by determining that a format of a video content item is to be switched to a different format, to select a format of a video content item, and/or determine any other suitable information, such as shown in and described above in connection with FIG. 1.

Communication network 704 can be any suitable combination of one or more wired and/or wireless networks in some embodiments. For example, communication network 704 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 706 can be connected by one or more communications links (e.g., communications links 712) to communication network 704 that can be linked via one or more communications links (e.g., communications links 714) to server 702. The communications links can be any communications links suitable for communicating data among user devices 706 and server 702 such as network links, dial-up links, wireless links, hard-wired links, any other suitable communications links, or any suitable combination of such links.

User devices 706 can include any one or more user devices suitable for uploading and/or streaming media content from server 702. In some embodiments, user device 706 can include any suitable type of user device, such as mobile phones, tablet computers, wearable computers, laptop computers, desktop computers, smart televisions, media players, game consoles, vehicle information and/or entertainment systems, and/or any other suitable type of user device. In some embodiments, user device 706 can begin uploading a video content item to server 702 or any other suitable content sharing server and, in response, user device 706 can receive an overall quality level of the uploaded video content item along with content labels for the content appearing within frames of the video content item, distortion types detected within frames of the video content item, a compression level for frames of the video content item, as described above in connection in FIG. 1. User device 706 can then determine whether to modify the uploaded video content item (e.g., to increase the overall quality level by modifying the uploaded video content item such that distortion is reduced or removed).

Although server 702 is illustrated as one device, the functions performed by server 702 can be performed using any suitable number of devices in some embodiments. For example, in some embodiments, multiple devices can be used to implement the functions performed by server 702.

Although two user devices 708 and 710 are shown in FIG. 7 to avoid over-complicating the figure, any suitable number of user devices, and/or any suitable types of user devices, can be used in some embodiments.

Server 702 and user devices 706 can be implemented using any suitable hardware in some embodiments. For example, in some embodiments, devices 702 and 706 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 800 of FIG. 8, such hardware can include hardware processor 802, memory and/or storage 804, an input device controller 806, an input device 808, display/audio drivers 810, display and audio output circuitry 812, communication interface(s) 814, an antenna 816, and a bus 818.

Hardware processor 802 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 802 can be controlled by a server program stored in memory and/or storage of a server, such as server 702. In some embodiments, hardware processor 802 can be controlled by a computer program stored in memory and/or storage 804 of user device 706.

Memory and/or storage 804 can be any suitable memory and/or storage for storing programs, data, and/or any other suitable information in some embodiments. For example, memory and/or storage 804 can include random access memory, read-only memory, flash memory, hard disk storage, optical media, and/or any other suitable memory.

Input device controller 806 can be any suitable circuitry for controlling and receiving input from one or more input devices 808 in some embodiments. For example, input device controller 806 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 810 can be any suitable circuitry for controlling and driving output to one or more display/audio output devices 812 in some embodiments. For example, display/audio drivers 810 can be circuitry for driving a touchscreen, a flat-panel display, a cathode ray tube display, a projector, a speaker or speakers, and/or any other suitable display and/or presentation devices.

Communication interface(s) 814 can be any suitable circuitry for interfacing with one or more communication networks (e.g., computer network 704). For example, interface(s) 814 can include network interface card circuitry, wireless communication circuitry, and/or any other suitable type of communication network circuitry.

Antenna 816 can be any suitable one or more antennas for wirelessly communicating with a communication network (e.g., communication network 704) in some embodiments. In some embodiments, antenna 416 can be omitted.

Bus 818 can be any suitable mechanism for communicating between two or more components 802, 804, 806, 810, and 814 in some embodiments.

Any other suitable components can be included in hardware 800 in accordance with some embodiments.

In some embodiments, at least some of the above described blocks of the process of FIG. can be executed or performed in any order or sequence not limited to the order and sequence shown in and described in connection with the figures. Also, some of the above blocks of FIG. 1 can be executed or performed substantially simultaneously where appropriate or in parallel to reduce latency and processing times. Additionally or alternatively, some of the above described blocks of the processes of FIG. 1 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), and/or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for determining perceptual quality indicators of video content items are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for video quality assessment, the method comprising:
    receiving a video content item;
    extracting a plurality of frames from the video content item;
    determining, using a first subnetwork of a deep neural network, a content quality indicator for each frame of the plurality of frames of the video content item, wherein the content quality indicator represents semantic-level embeddings for each frame of the plurality of frames of the video content item;
    determining, using a second subnetwork of the deep neural network, a video distortion indicator for each frame of the plurality of frames of the video content item, wherein the video distortion indicator indicates a quality of the frame based on distortions contained within the frame;
    determining, using a third subnetwork of the deep neural network, a compression sensitivity indicator for each frame of the plurality of frames of the video content item;
    generating a quality level for each frame of the plurality of frames of the video content item that concatenates the content quality indicator, the video distortion indicator, and the compression sensitivity indicator for that frame of the video content item;
    generating an overall quality level for video content item by aggregating the quality level of each frame of the plurality of frames; and
    causing a video recommendation to be presented based on the overall quality level of the video content item.

2. The method of claim 1, wherein the first subnetwork of the deep neural network further outputs predicted content labels that describe content appearing in each frame of the plurality of frames of the video content item.

3. The method of claim 1, wherein the video distortion indicator further represents distortion-sensitive embeddings for each frame of the plurality of frames of the video content item and wherein the second subnetwork of the deep neural network further outputs detected distortion types that describe distortion detected in each frame of the plurality of frames of the video content item.

4. The method of claim 1, wherein the compression sensitivity indicator represents compression-sensitive embedding features for each frame of the plurality of frames of the video content item and wherein the third subnetwork of the deep neural network further outputs a compression level score.

5. The method of claim 1, wherein the overall quality level is generated using a convolutional neural network that outputs a respective quality level for each frame of the plurality of frames of the video content item and that averages the respective quality levels.

6. The method of claim 1, wherein the video recommendation includes a recommendation to further compress the video content item based on the overall quality level.

7. The method of claim 1, wherein the video recommendation includes a recommendation to an uploader of the video content item to modify a portion of the video content item based on the quality level associated with that frame of the video content item.

8. A system for video quality assessment, the system comprising:
a hardware processor that is configured to:
receive a video content item;
extract a plurality of frames from the video content item;
determine, using a first subnetwork of a deep neural network, a content quality indicator for each frame of the plurality of frames of the video content item, wherein the content quality indicator represents semantic-level embeddings for each frame of the plurality of frames of the video content item;
determine, using a second subnetwork of the deep neural network, a video distortion indicator for each frame of the plurality of frames of the video content item, wherein the video distortion indicator indicates a quality of the frame based on distortions contained within the frame;
determine, using a third subnetwork of the deep neural network, a compression sensitivity indicator for each frame of the plurality of frames of the video content item;
generate a quality level for each frame of the plurality of frames of the video content item that concatenates the content quality indicator, the video distortion indicator, and the compression sensitivity indicator for that frame of the video content item;
generate an overall quality level for video content item by aggregating the quality level of each frame of the plurality of frames; and
cause a video recommendation to be presented based on the overall quality level of the video content item.

9. The system of claim 8, wherein the first subnetwork of the deep neural network further outputs predicted content labels that describe content appearing in each frame of the plurality of frames of the video content item.

10. The system of claim 8, wherein the video distortion indicator further represents distortion-sensitive embeddings for each frame of the plurality of frames of the video content item and wherein the second subnetwork of the deep neural network further outputs detected distortion types that describe distortion detected in each frame of the plurality of frames of the video content item.

11. The system of claim 8, wherein the compression sensitivity indicator represents compression-sensitive embedding features for each frame of the plurality of frames of the video content item and wherein the third subnetwork of the deep neural network further outputs a compression level score.

12. The system of claim 8, wherein the overall quality level is generated using a convolutional neural network that outputs a respective quality level for each frame of the plurality of frames of the video content item and that averages the respective quality levels.

13. The system of claim 8, wherein the video recommendation includes a recommendation to further compress the video content item based on the overall quality level.

14. The system of claim 8, wherein the video recommendation includes a recommendation to an uploader of the video content item to modify a portion of the video content item based on the quality level associated with that frame of the video content item.

15. A non-transitory computer-readable medium containing computer executable instructions that, when executed by a processor, cause the processor to:
receive a video content item;
extract a plurality of frames from the video content item;
determine, using a first subnetwork of a deep neural network, a content quality indicator for each frame of the plurality of frames of the video content item, wherein the content quality indicator represents semantic-level embeddings for each frame of the plurality of frames of the video content item;
determine, using a second subnetwork of the deep neural network, a video distortion indicator for each frame of the plurality of frames of the video content item, wherein the video distortion indicator indicates a quality of the frame based on distortions contained within the frame;
determine, using a third subnetwork of the deep neural network, a compression sensitivity indicator for each frame of the plurality of frames of the video content item;
generate a quality level for each frame of the plurality of frames of the video content item that concatenates the content quality indicator, the video distortion indicator, and the compression sensitivity indicator for that frame of the video content item;
generate an overall quality level for video content item by aggregating the quality level of each frame of the plurality of frames; and
cause a video recommendation to be presented based on the overall quality level of the video content item.

16. The non-transitory computer-readable medium of claim 15, wherein the first subnetwork of the deep neural network further outputs predicted content labels that describe content appearing in each frame of the plurality of frames of the video content item.

17. The non-transitory computer-readable medium of claim 15, wherein the video distortion indicator further represents distortion-sensitive embeddings for each frame of the plurality of frames of the video content item and wherein the second subnetwork of the deep neural network further outputs detected distortion types that describe distortion detected in each frame of the plurality of frames of the video content item.

18. The non-transitory computer-readable medium of claim 15, wherein the compression sensitivity indicator represents compression-sensitive embedding features for each frame of the plurality of frames of the video content item and wherein the third subnetwork of the deep neural network further outputs a compression level score.

19. The non-transitory computer-readable medium of claim 15, wherein the overall quality level is generated using a convolutional neural network that outputs a respective quality level for each frame of the plurality of frames of the video content item and that averages the respective quality levels.

20. The non-transitory computer-readable medium of claim 15, wherein the video recommendation includes a recommendation to further compress the video content item based on the overall quality level.

21. The non-transitory computer-readable medium of claim 15, wherein the video recommendation includes a recommendation to an uploader of the video content item to modify a portion of the video content item based on the quality level associated with that frame of the video content item.

* * * * *